(12) United States Patent
Ihara

(10) Patent No.: US 8,525,011 B2
(45) Date of Patent: Sep. 3, 2013

(54) METHOD, SYSTEM AND APPARATUS FOR INSTRUCTING A KEYBOARDIST

(76) Inventor: Ken Ihara, London (GB)

( * ) Notice: Subject to any disclaimer, the term of this patent is extended or adjusted under 35 U.S.C. 154(b) by 418 days.

(21) Appl. No.: 12/782,786

(22) Filed: May 19, 2010

(65) Prior Publication Data

US 2011/0283867 A1    Nov. 24, 2011

(51) Int. Cl.
*G09B 15/08* (2006.01)

(52) U.S. Cl.
USPC .......................... 84/478; 84/464 R; 84/477 R

(58) Field of Classification Search
USPC .......................................................... 84/478
See application file for complete search history.

(56) References Cited

U.S. PATENT DOCUMENTS

| | | | |
|---|---|---|---|
| 3,379,087 A | 4/1968 | Weitzner | |
| 3,610,086 A | 10/1971 | Decker | |
| 3,744,366 A | 7/1973 | Del Castillo | |
| 4,516,465 A | 5/1985 | Kani | |
| 4,730,533 A | 3/1988 | Schoerkmayr | |
| 4,790,230 A | 12/1988 | Sanderson | |
| 5,107,743 A * | 4/1992 | Decker | 84/478 |
| 5,214,231 A * | 5/1993 | Ernst et al. | 84/652 |
| 5,266,735 A | 11/1993 | Shaffer et al. | |
| 5,392,682 A | 2/1995 | McCartney-Hoy | |
| 5,394,784 A * | 3/1995 | Pierce et al. | 84/464 A |
| 5,656,789 A | 8/1997 | Nakada et al. | |
| 5,783,764 A * | 7/1998 | Amar | 84/479 A |
| 5,827,988 A | 10/1998 | Wachi | |
| 6,011,210 A | 1/2000 | Haruyama et al. | |
| 6,037,534 A | 3/2000 | Yasutoshi et al. | |
| 6,209,838 B1 * | 4/2001 | Anderson et al. | 248/346.01 |
| 6,337,433 B1 * | 1/2002 | Nishimoto | 84/464 A |
| 6,407,324 B1 | 6/2002 | Hulcher | |
| 6,410,836 B2 * | 6/2002 | Takahashi | 84/478 |
| 6,545,208 B2 | 4/2003 | Hiratsuka | |
| 7,507,893 B2 | 3/2009 | Knudsen | |
| 7,629,527 B2 | 12/2009 | Hiner et al. | |
| 2002/0177113 A1 * | 11/2002 | Sherlock | 434/308 |

FOREIGN PATENT DOCUMENTS

| | | |
|---|---|---|
| FR | 2479516 A1 | 10/1981 |
| JP | 5046069 A | 2/1993 |
| JP | 2007078956 A | 3/2007 |

* cited by examiner

*Primary Examiner* — Christopher Uhlir
(74) *Attorney, Agent, or Firm* — Schmeiser, Olsen & Watts, LLP

(57) ABSTRACT

Disclosed is player module that includes an outer frame and a signal receiver configured to receive a plurality of note-on signals, each corresponding to a musical pitch and a plurality of note-off signals, each corresponding to a musical pitch. The player module includes a plurality of LEDs extending along the outer frame. Each LED is located above a key of a keyboard when the elongated outer frame is placed above the keys of the keyboard. Each of the plurality of LEDs is controlled by a corresponding note-on signal and a corresponding note-off signal, such that each of the plurality of LEDs is configured to illuminate when the processor receives the corresponding note-on signal and each of the plurality of LEDs is configured to stop illuminating when the processor receives the corresponding note-off signal.

19 Claims, 9 Drawing Sheets

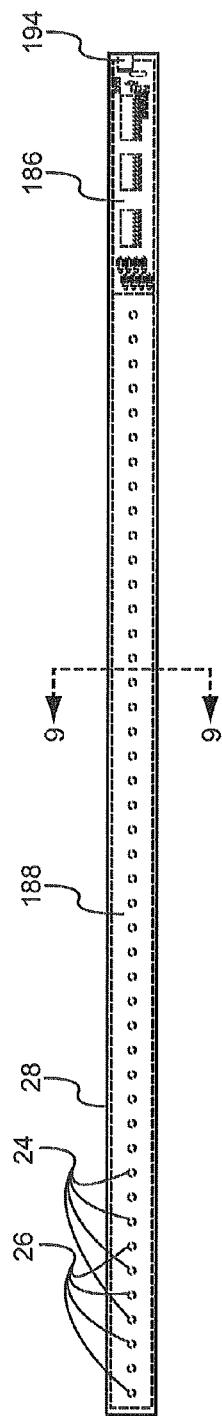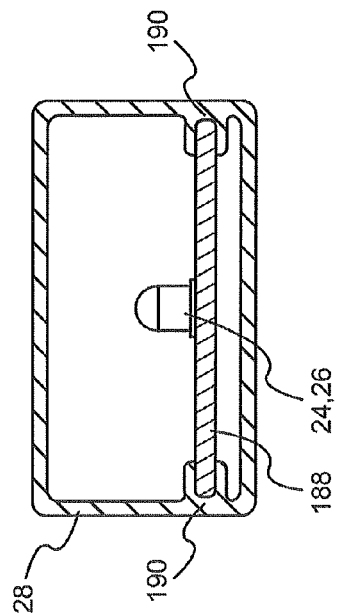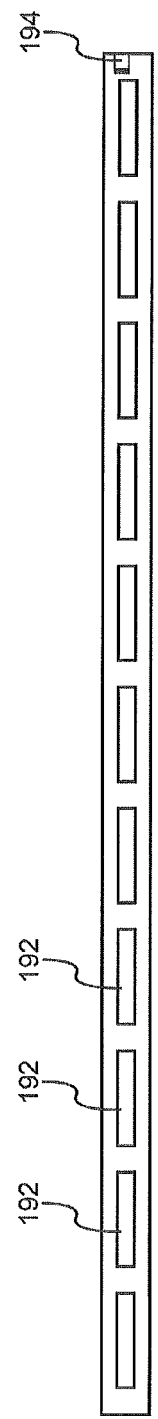

METHOD, SYSTEM AND APPARATUS FOR INSTRUCTING A KEYBOARDIST

FIELD OF TECHNOLOGY

The subject matter disclosed herein relates generally to piano or keyboard instruction. More particularly, the subject matter relates to a method, system and apparatus to instruct a keyboardist.

BACKGROUND

Learning the piano or keyboard takes considerable time and patience. Students often attend lessons in which an instructor may teach which notes on a written score correspond to which keys on a keyboard or piano, and also how to position the student's hands for chords or notes. However, piano instruction may cost a significant amount of money, and may not be affordable for many potential students. Further, an instructor typically only instructs a student for one session per week. This requires the student to practice alone for the majority of the students playing time. Because a practicing student is typically very slow at translating a score into the correct finger positions, it may be difficult for a student to learn a piece of music. Furthermore, it may be difficult for a student to play the piece of music with a consistent tempo without the piano instructor or use of a metronome.

Thus, a method, system and apparatus to instruct a pianist or keyboardist would be well received in the art.

BRIEF DESCRIPTION

According to one described aspect, a computer system comprises a processor and a computer-readable memory unit coupled to the processor, the memory unit containing instructions that when executed by the processor implement a method of instructing a keyboardist, the method comprises: the processor receiving music data including: a plurality of note-on events, each including time domain data and corresponding to a musical pitch; and a plurality of note-off events, each including time domain data and corresponding to a musical pitch; the processor arranging a score from the music data; the processor displaying the score on a display; the processor playing the score; the display indicating the location of the score being played during the playing of the score; the processor outputting a plurality of note-on signals to an external player module during the playing of the score, each of the plurality of note-on signals corresponding to one of the plurality of note-on events, wherein each of the plurality of note-on signals are configured to illuminate the particular LED, wherein the particular LED corresponds to the musical pitch of the note-on event with which the note-on signal corresponds; and the processor outputting a plurality of note-off signals to the external player module during the playing of the score, each of the plurality of note-off signals corresponding to one of the plurality of note-off events, wherein each of the plurality of note-off signals are configured to stop illumination of the particular LED, wherein the particular LED corresponds to the musical pitch of the note-off event with which the note-off signal corresponds.

According to another described aspect, a computer program product, comprises a non-transitory computer-readable storage medium having a computer-readable program code stored therein, said computer-readable program code containing instructions configured to be executed by a processor of a computer system to implement a method of instructing a keyboardist, the method comprises: the processor receiving music data including: a plurality of note-on events, each including time domain data and corresponding to a musical pitch; and a plurality of note-off events, each including time domain data and corresponding to a musical pitch; the processor arranging a score from the music data; the processor displaying the score on a display; the processor playing the score; the display indicating the location of the score being played during the playing of the score; the processor outputting a plurality of note-on signals to an external player module during the playing of the score, each of the plurality of note-on signals corresponding to one of the plurality of note-on events, wherein each of the plurality of note-on signals are configured to illuminate the particular LED, wherein the particular LED corresponds to the musical pitch of the note-on event with which the note-on signal corresponds; and the processor outputting a plurality of note-off signals to the external player module during the playing of the score, each of the plurality of note-off signals corresponding to one of the plurality of note-off events, wherein each of the plurality of note-off signals are configured to stop illumination of the particular LED, wherein the particular LED corresponds to the musical pitch of the note-off event with which the note-off signal corresponds.

According to yet another described aspect, a player module comprises an elongated outer frame; a signal receiver configured to receive: a plurality of note-on signals, each corresponding to a musical pitch; and a plurality of note-off signals, each corresponding to a musical pitch; and a plurality of LEDs extending along the elongated outer frame such that each individual LED is located above a corresponding key of a keyboard when the elongated outer frame is placed above the keys of the keyboard; and wherein each of the plurality of LEDs is controlled by a corresponding note-on signal and a corresponding note-off signal, such that each of the plurality of LEDs is configured to illuminate when the processor receives the corresponding note-on signal and each of the plurality of LEDs is configured to stop illuminating when the processor receives the corresponding note-off signal.

According to still another described aspect, a player module comprises an elongated outer frame; a processor configured to receive: a plurality of note-on signals, each corresponding to a musical pitch; and a plurality of note-off signals, each corresponding to a musical pitch; and a plurality of LEDs each extending along the elongated outer frame such that each individual LED is located above a corresponding key of a keyboard when the elongated outer frame is placed on top of the keys of the keyboard; the processor configured to illuminate a particular LED from the plurality of LEDs when the particular LED corresponds to a musical pitch of a note-on signal received by the processor; and the processor configured to stop illuminating the particular LED when the particular LED corresponds to a musical pitch of a note-off signal received by the processor.

BRIEF DESCRIPTION OF THE DRAWINGS

The subject matter which is regarded as the invention is particularly pointed out and distinctly claimed in the claims at the conclusion of the specification. The foregoing and other features and advantages are apparent from the following detailed description taken in conjunction with the accompanying drawings in which:

FIG. 8 depicts a top view of an embodiment of the player module of FIG. 1;

FIG. 9 depicts a cross sectional view of an embodiment of the player module of FIGS. 1 and 8 taken at arrows 9-9;

FIG. 10 depicts a bottom view of an embodiment of the player module of FIGS. 1, 8 and 9.

DETAILED DESCRIPTION

A detailed description of the hereinafter described embodiments of the disclosed apparatus and method are presented herein by way of exemplification and not limitation with reference to the Figures.

Figure 1:
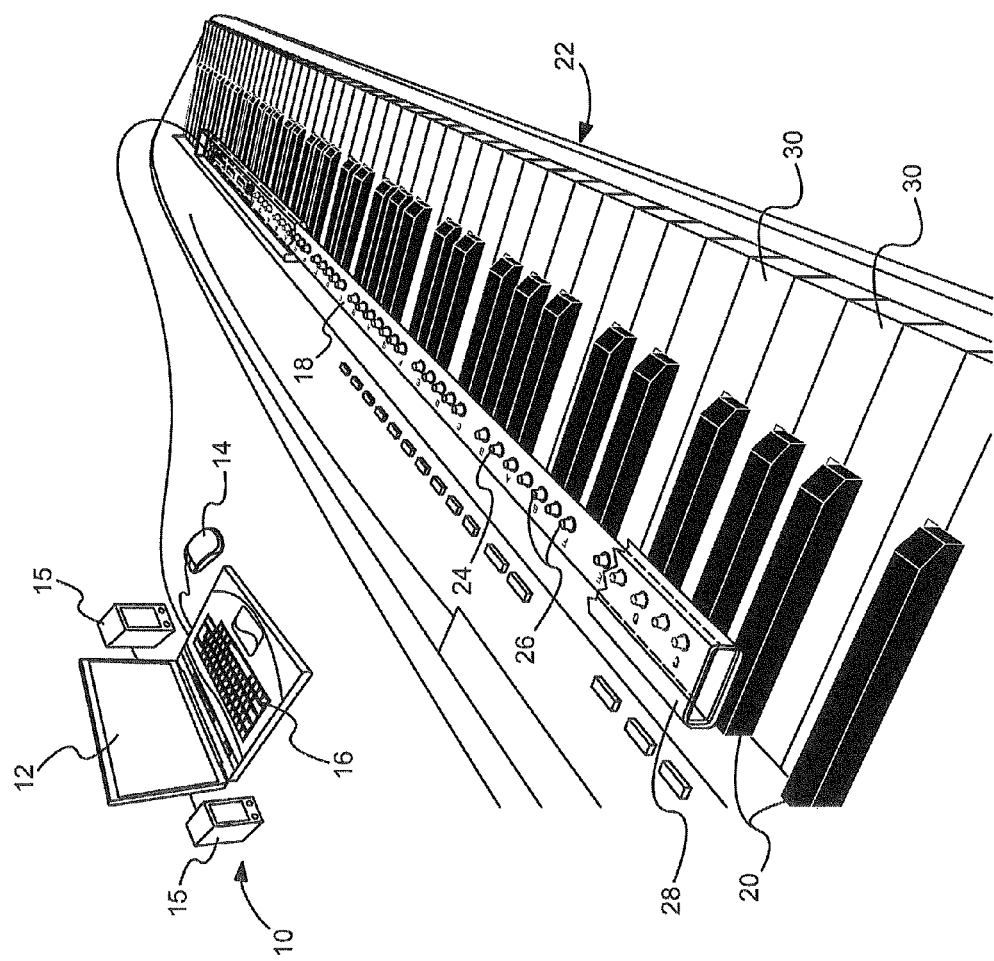
FIG. 1 depicts a perspective view of an embodiment of a computer system in communication with an embodiment of a player module.

Referring first to FIG. 1, a computer system 10 is shown. The computer system 10 includes a display 12, a mouse 14, speakers 15 and a computer keyboard 16. The computer system 10 is in communication with a player module 18 that is shown resting above the black keys 20 of a keyboard 22. It should be understood that the term "keyboard" is hereinafter used to describe any type of musical keyboard, piano (acoustic or electric) or other keyed musical instrument. Examples of "keyboards" will be apparent to those skilled in the art of music. Likewise, a "keyboardist" is herein defined by any player of any such instrument. Furthermore, while the speakers 15 are shown as two external speakers, more speakers are contemplated. Additionally, the speakers 15 may be internal speakers.

The player module 18 includes a plurality of light emitting diodes 24, 26 (hereinafter "LEDs") extending along an elongated outer frame 28. Each of the individual plurality of LEDs 24, 26 are interspaced such that they are each located above a corresponding key 20, 30 of the keyboard 22 when the player module 18 is placed in a correct position onto the keyboard 22. The computer system 10 is configured receive music data comprising a song and arrange a score 34 (shown in FIG. 7) from the music data, and to display the score 34 on the display 12. The computer system 10 is configured to include a user interface 142 (shown in FIG. 7) for interacting with the playing of the score, and the player module 18. The computer system 10 is also configured to play the score 34, indicating a location 36 of the score 34 being played on the display 12. While the song is being played, the computer system 10 is configured to output signals that are configured to illuminate and stop illuminating particular LEDs 24, 26 corresponding to the keys 20, 30 to be pressed and released by a keyboardist to correctly perform the song. Furthermore, while the song is being played, the computer system 10 is configured to output the signals to the speakers 15 in order to simultaneously audibly hear a computer rendition of the song or composition.

Figure 2:
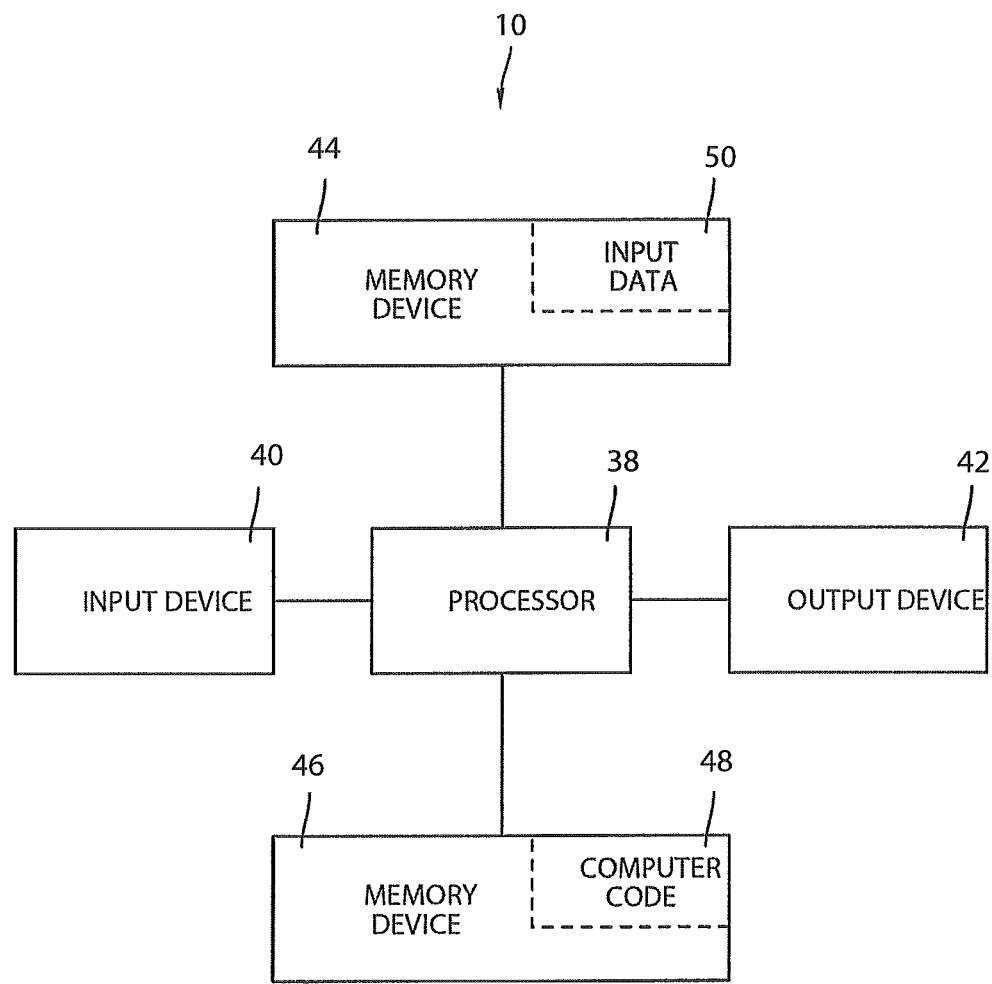
FIG. 2 depicts an embodiment of the computer system of FIG. 1.

FIG. 2 illustrates the computer system 10 (examples of which may be various embodiments of described hereinbelow) used for performing a method or process for instructing a keyboardist. The computer system 10 may comprise a processor 38, an input device 40 coupled to the processor 38, an output device 42 coupled to the processor 38, and memory devices 44 and 46 each coupled to the processor 38. The input device 40 may be, among other things, a keyboard such as the computer keyboard 16, a pointing device such as the mouse 14, a touch screen, or the like. The output device 42 may be, among other things, a printer, a plotter, a computer screen such as the display 12, a magnetic tape, a removable hard disk, a floppy disk, etc. The memory devices 44 and 46 may be, among other things, a hard disk, a floppy disk, a magnetic tape, an optical storage such as a compact disc (CD) or a digital video disc (DVD), a dynamic random access memory (DRAM), a read-only memory (ROM), etc. The memory device 44 may include a computer code 48. The computer code 48 includes algorithms or a predetermined set of parameters for performing a process for monitoring a communication system. The processor 10 may execute the computer code 48. The memory device 46 may include input data 50. The input data 50 includes input required by the computer code 48. The output device 42 displays output from the computer code 48. Either or both memory devices 44 and 46 (or one or more additional memory devices not shown in FIG. 2) may comprise the algorithm or predetermined parameters and may be used as a computer usable medium (or a computer readable medium or a program storage device) having a computer readable program code embodied therein and/or having other data stored therein, wherein the computer readable program code comprises the computer code 48. Generally, a computer program product (or, alternatively, an article of manufacture) of the computer system 10 may comprise said computer usable medium (or said program storage device).

While FIG. 2 shows the computer system 10 as a particular configuration of hardware and software, any configuration of hardware and software, as would be known to a person of ordinary skill in the art, may be utilized for the purposes stated herein in conjunction with the particular computer system 10 of FIG. 2. For example, the memory devices 44 and 46 may be portions of a single memory device rather than separate memory devices. Other examples of computer system 10 include mobile devices such as an Ipad®, Iphone®, Droid®, a smartphone, or the like.

It should be noted that the embodiments described hereinbelow illustrate the architecture, functionality, and operation of possible implementations of systems, methods and computer program products according to various described and depicted embodiments. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagram illustrations, can be implemented by special purpose hardware-based systems that perform the specified functions or acts, or combinations of special purpose hardware and computer instructions.

Figure 3:
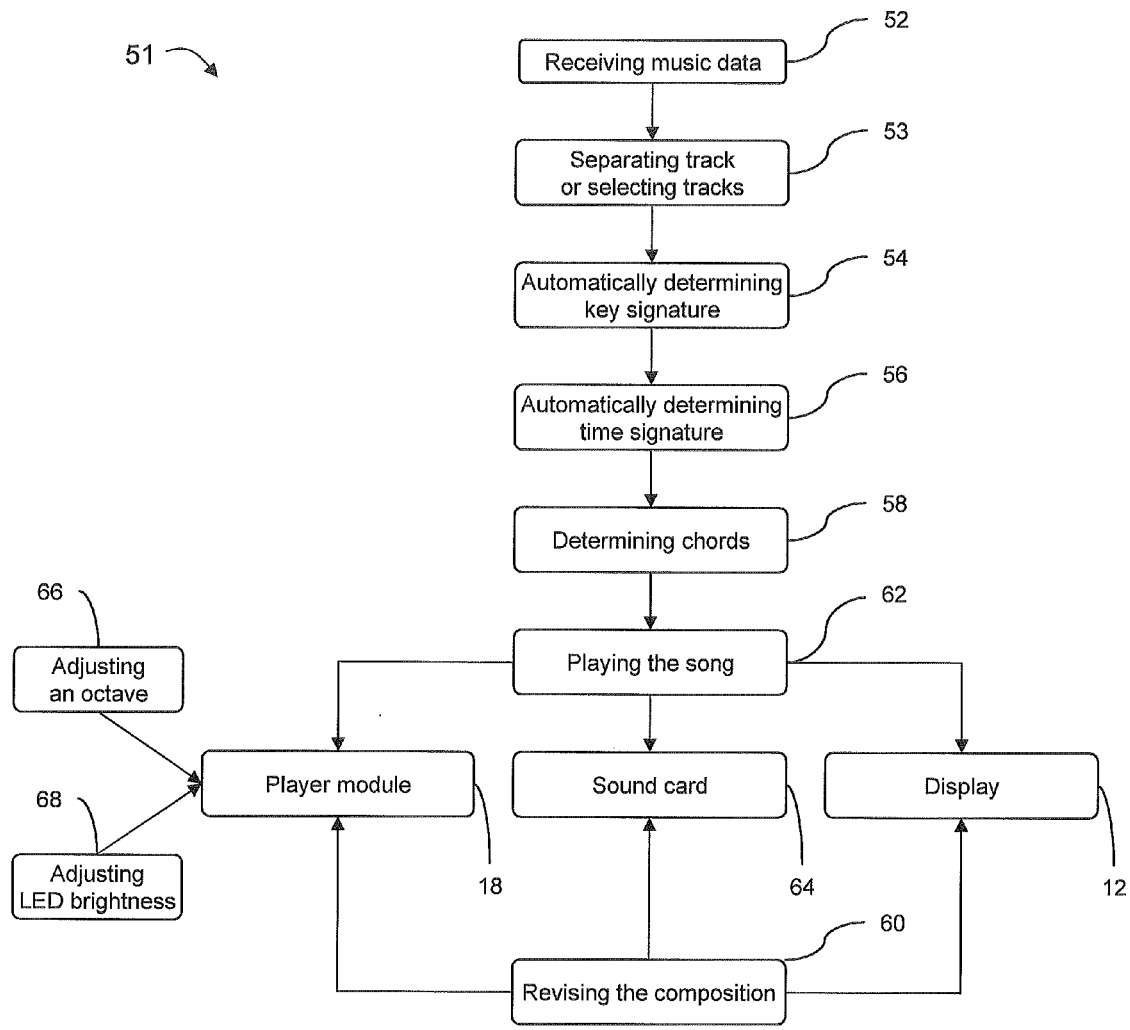
FIG. 3 depicts a block diagram of an embodiment of a method implemented by an embodiment of the computer system of FIGS. 1 and 2.

Referring now to FIG. 3, a block diagram of a method 51 implemented by the computer system 10 is shown in accordance with one embodiment. The method 51 comprises a first step of receiving music data 52. The receiving music data 52 may be performed by the computer system 10. The music data may be loaded onto the computer system 10 through an input device 40 such as a CD-drive or USB port (not shown). The data may be stored in at least one of the memory devices 44, 46 described hereinabove. The music data may be compiled, by the computer system 10, into a song or composition. The computer system 10 may thus be able to play the song or composition. In order to do this, the music data may comprise a plurality of note-on events, each including time domain data and corresponding to a musical pitch. For example, one note-on event may correspond to a C-sharp note, and may also include a particular time when the note is read by the computer system 10 during the song or composition. Likewise, the music data may also include a plurality of note-off events, each including time domain data and corresponding to a music pitch. For example, the note-off event may correspond to the C-sharp note, and may include a particular time when the note is read by the computer system 10 playing the song or composition. Thus, a note-off event may "turn off" the C-sharp note that was "turned on" by the C-sharp note-on event described hereinabove. The music data may, for example, comprise a MIDI file, as is commonly known in the art. However, other file types are also contemplated.

Figure 7:
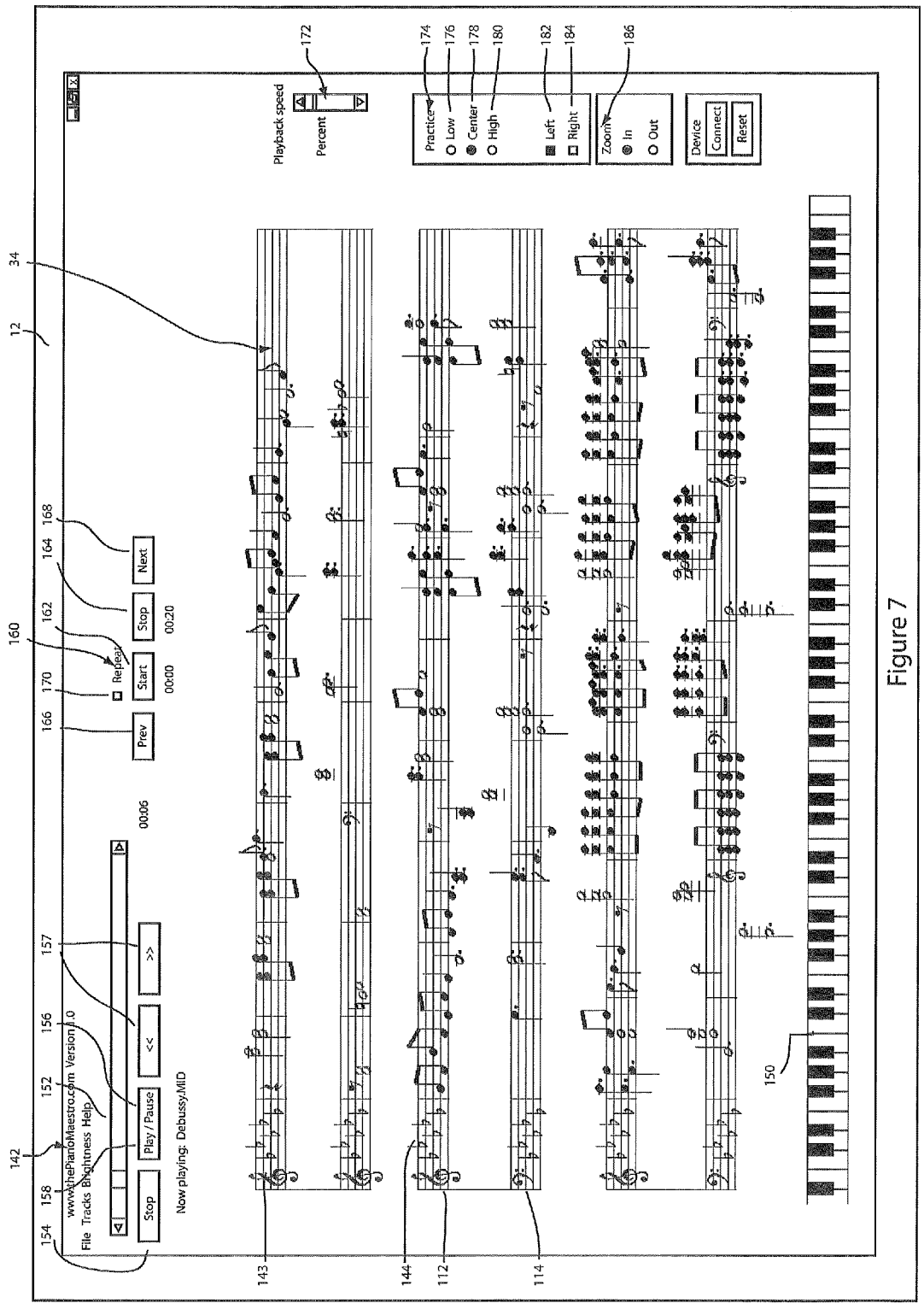
FIG. 7 depicts a display of an embodiment of the computer system of FIGS. 1-6.

Once the music data has been received by the processor 10, the method 51 may comprise undergoing at least three algorithms which create the score 34 (shown in FIG. 7).

Sometimes the note-on and note-off events are recorded in one single track. The method 51 may further comprise separating one single track into two tracks 53, where an algorithm estimates the separation of the left and right hands. Sometimes the note-on and note-off events are recorded in multiple tracks to represent different instruments. Method 51 comprises a way for the user to select which tracks to be played.

The method 51 may comprise the computer system 10 automatically determining a key signature 54 from the inputted and received musical data. Determining the key signature 54 may be accomplished by counting the number of times each note is played in the song. The computer system 10 may then determine how many accidental signs would have to be displayed for the song in each of the thirteen possible sharp and flat key signatures. The key signature that requires the least number of accidental signs may be the key signature used by the computer system 10 to display the notes.

Next, the method 51 may comprise automatically determining a time signature 56 by the computer system 10. The time signature of the song or composition may be provided in the musical data received by the computer system 10. For example, the received music data may also include time signature data in addition to the note-on and the note-off events. However, in the case that the time signature is not provided, a predetermined time signature may be assumed by the computer system 10.

Determining the chords 58 may also be performed by the computer system 10 in accordance with the method 51. This algorithm for determining chords 58 may include aligning the notes from time domain data of the note-on events and the note-off events so that they are displayed as chords. In the case that the musical data includes note-on events and note-off events that are delayed by a fraction of a second between the start or end times of two or more notes in a chord, the computer system 10 may find notes with similar start times and reassign the notes to have the exact same start time. Thus, in the case that the song or composition was created into music data by a human keyboardist recording the data while playing a digitally recordable instrument, any imperfect start times for individual notes of a chord that result may be automatically accounted for and reassigned by the computer system 10.

The method 51 further may include revising the composition 60 by a user. The user may revise the composition in many ways by inputting a command to the computer system 10 via the input device 40 such as the computer keyboard 16 or the mouse 14. For example, the speed of the play may be revised prior to or during the playing of the composition. Alternately, the computer system 10 may include an option to select which hand to play. The computer system 10 may play both hands of a composition or song by default, but a user may instead activate only the left hand or only the right hand. In this arrangement, the playing of the composition may thereby only include the active hand. In the case of the musical data being a MIDI file, those skilled in the art should understand that the left hand data may be automatically separated into first and second "tracks." The computer system 10 may also revise the composition in any other way that would be appropriate for instructing a student using the methods and devices described herein.

The method may include playing the song or composition 62 by the computer system 10. The playing of the song 62 may comprise playing the song by a sound card 64 of the computer system 10. The sound card of the computer system 10 may be in communication with the speakers 15 or any other audio device such that the song is audible while being played by the computer system 10. Furthermore, the playing of the song 62 may comprise playing the song by the display 12. During the playing of the song 62, the display 12 may indicate a location on the score that is being played. For example, the notes that have been played of the score may change to a different color than the un-played notes in order to indicate which position on the score is being played.

The playing of the song 62 may also comprise playing the song by the player module 18. In order to play the song by the player module 18, the computer system 10 may output note-on signals and note-off signals to the player module 18. Each of the note-on signals output to the player module 18 may correspond to a note-on event while each of the note-off signals may correspond to a note-off event. Thus, each note-on and note-off signal sent may correspond to an individual musical pitch, and may illuminate or stop illuminating one of the LEDs 24, 26 that is located above the correct corresponding key 20, 30 of the keyboard 22 when the player module 18 is resting on the keyboard 22 in the correct position. The note-on signal may illuminate the corresponding LED 24, 26 while the note-off signal may stop illumination of the corresponding LED 24, 26.

In one embodiment contemplated, the player module 18 may be smaller than a standard keyboard or piano. In this embodiment, the player module 18 may therefore have less than eighty-eight LEDs. This may be particularly useful when the player module 18 is intended for transportation by a student, teacher or other keyboardist. In this embodiment, the player module 18 may be shorter in length and easier to carry. Furthermore, in this embodiment the method 51 may include a user adjusting an octave 66 by inputting a command to the computer system 10 via the input device 40 that shifts the output on the player module 18 by an octave of twelve notes. This allows the keyboardist to move the player module 18 up or down an octave over the keyboard 22, in the case that a musical composition requires higher or lower notes to be played. For example, the player module 18 may have sixty-four of the LEDs 24, 26, but may be configured to shift up or down 12 notes, thereby being able to rest over any of the keys 20, 30 of the keyboard 22, albeit only sixty-four of the keys 20, 30 at a time. This octave shift command 66 may also be input into the player module 18, rather than through the computer system 10. Furthermore, the adjusting an octave 66 may be input before or during the playing of the composition or song 62.

Moreover, the method 51 may include a user adjusting LED brightness 68 of the LEDs 24, 26 by inputting another command to the computer system. Like the octave shift 66, the brightness adjustment 68 may be implemented before or during the playing of the song 62. Thus, in brightly lit room a user may increase the brightness of the LEDs 24, 26 to increase for ease of visibility. Furthermore, it should be understood that the revising the composition 60 step may be completed before, during or after the playing of the song 62. Thus, FIG. 3 displays that the revising the composition 60 step may be before the playing of the song 62 or may affect one, all or a combination of the player module 18, the sound card 64 and the display 12 after the playing of the song 62.

The computer program may be loaded on the computer system 10 and can be described more particularly by outlining three functional methods. The first may be a data method 70, shown more particularly in FIG. 4. The second may be a score method 72, shown more particularly in FIG. 5. The third may be a player method 74, shown more particularly in FIG. 6.

Figure 4:
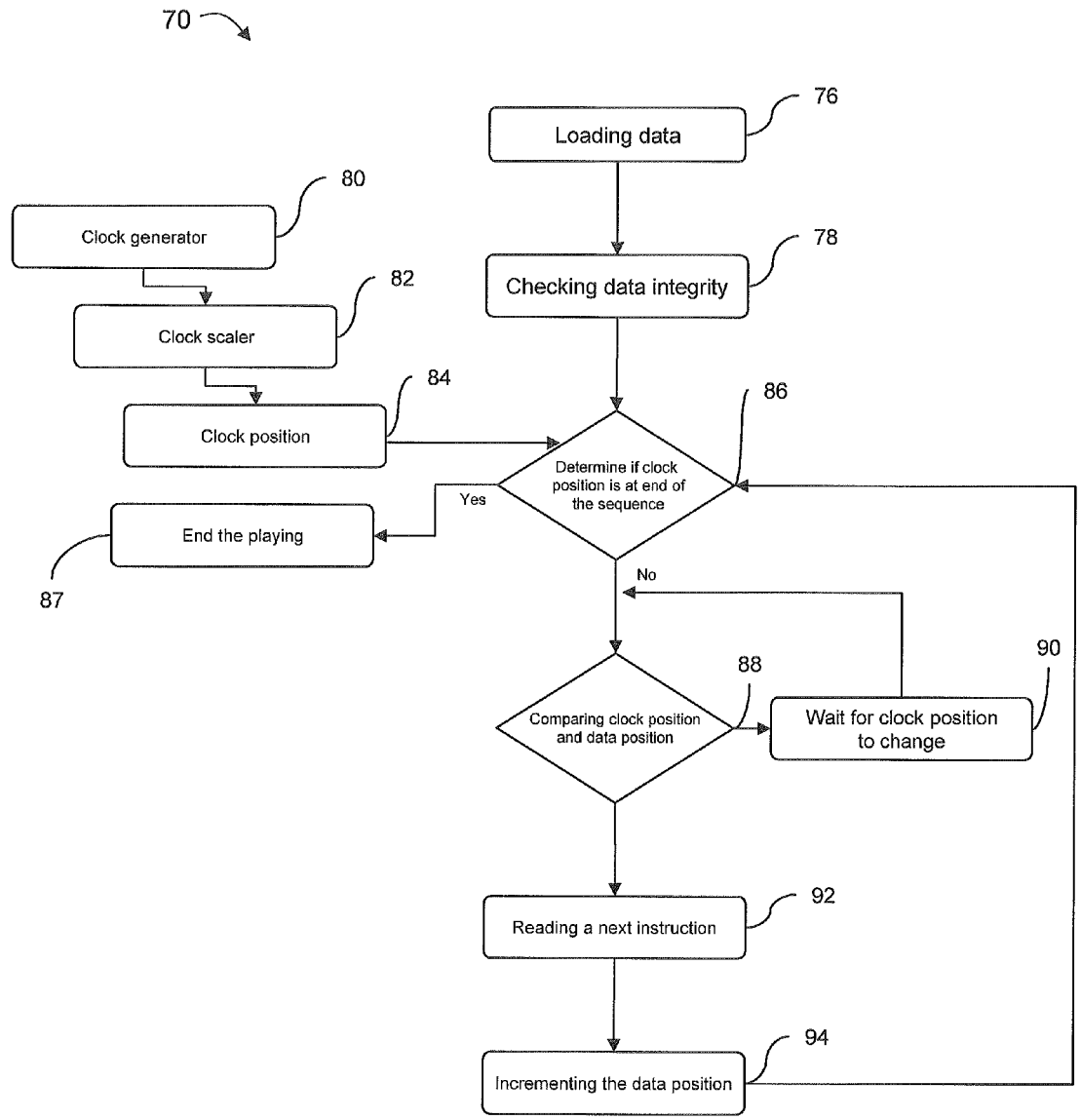
FIG. 4 depicts a block diagram of an embodiment of a data method implemented by an embodiment of the computer system of FIGS. 1-3.

Shown in FIG. 4, the data method 70 may include a first step of loading data 76. The loading data 76 step may include loading the musical data comprising the note-on events and the note-off events into the memory device 44, 46 of the computer system 10. The computer system 10 may next perform a function of checking the data integrity 78 to make sure that the note-on events and the note-off events are in sequential order.

The computer system 10 may include a clock generator 80. The clock generator may be a source of constant clock ticks at a constant predetermined frequency. The computer system 10 may also include a clock scaler 82. The clock scaler may create an event when a predetermined number of clock ticks are received during the playing of the song 62. Furthermore, the computer system 10 may include a clock positioner 84. The clock positioner 84 may be a counter that increments a position when it receives a signal from the clock scaler 82. Combined, the clock generator 80, the clock scaler 82, and the clock positioner 84 may allow the computer system 10 to play the song at various speeds, from various locations, and perform many of the various functionalities of the present embodiments described herein.

During the playing of the song 62, the method 70 may include determining if the clock position is at the end of the sequence 86. If the clock position is at the end of the data sequence, then the playing ends 87. If the clock position is not at the end of the data sequence, then the computer system 10 may check if the clock position is equal to the data position 88. If the clock position is less than the data position, the computer system 10 may then wait for the clock position to change 90. If the clock position is equal to the data position, then the method 70 may proceed to reading a next instruction 92 by the computer system 10.

If the next instruction is a note-on event then the computer system 10 sends an instruction to the player module 18 to turn on or illuminate a corresponding LED 24, 26. The computer system 10 also sends an instruction to the soundcard 64 to generate a tone on the speakers, headphones or other audio device. The computer system 10 also sends an instruction to the display 12 to indicate that the note-on event has been played by the computer system 10. This may turn the note a different color on the score 34, as described herein above.

If the next instruction is a note-off event then the computer system 10 may send an instruction to the player module 18 to turn off or stop illuminating the corresponding LED 24, 26. The computer system 10 may also send an instruction to the soundcard 64 to stop generating the tone on the speakers, headphones or other audio device.

It should also be understood that the instruction may be a meta-event that is neither a note-on event nor a note-off event. In this scenario, the instruction may be interpreted by the computer system 10 to change any associated settings.

Finally, the method 70 may include incrementing the data position 94. This causes computer system 10 to loop back to the comparing of the data position and the clock position 86, as described above. The computer may continue the playing of the song 62 until the clock position comes to the end of the sequence at the end of the song. When this occurs, the computer system 10 may proceed to end playing the song 87 step, as described hereinabove.

Figure 5:
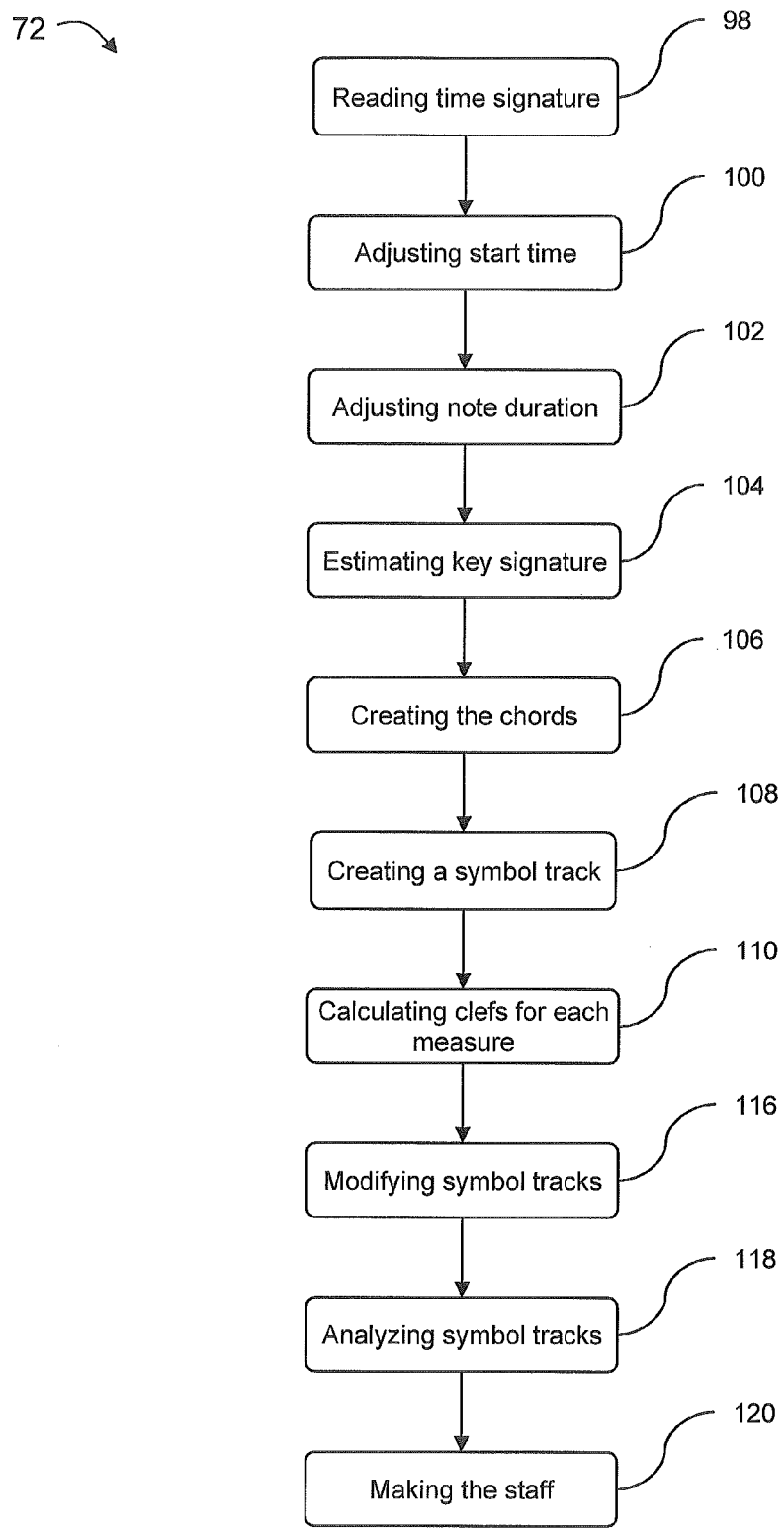
FIG. 5 depicts a block diagram of an embodiment of a score method implemented by an embodiment of the computer system of FIGS. 1-4.

Referring now to FIG. 5, the score method 72 is shown. The score method 72 outlines more particularly how the computer system 10 may interpret the information contained in the music data, such as a MIDI file, and how the computer system 10 may display the information as the musical score 34 on the display screen 12. The musical score 34 may be stored in the music data in a dedicated data structure derived from the music data or MIDI file. This data structure may be modified so that it contains all the information needed to create the score 34 on the screen 12.

The score method 72 may first comprise reading the time signature 98 from the music data or MIDI file. This information may be used to determine the measure length and the types of notes (i.e. whole, half, quarter, eighth, etc.). If the time signature information or data is not inherently present in the music data or MIDI file, a predetermined time signature may be assumed as described hereinabove.

The method 72 may then comprise adjusting the start time 100 for each note, as described hereinabove. This step may allow notes that have start times within a pre-determined window to be reassigned with identical start times. When displayed on the screen 12, the notes may then be aligned vertically to form the basis for the chords.

The method 72 may further include adjusting the duration of the notes 102. The notes may be adjusted so that the end of an earlier note will end when the next note begins. This adjusting may prevent rest notes from occurring before a next note in the case that a short note is unintentionally shortened slightly.

The method 72 may also comprise estimating the key signature 104, such as the key signature 54. To estimate the key signature, as described hereinabove, an algorithm may count the number of occurrences of each black key 20 that is played in the song. The method 72 may then simulate the playing of the song in each possible key signature and counts the number of accidental symbols needed to display the track in each key. The estimating the key signature 104 then selects the key signature that uses the least number of accidental symbols to apply to the score 34.

The method 72 further comprises creating the chords 106 such that all the notes having the same start times are grouped together. The creating the chords step 106 may comprise any or all of the features of the determining of the chords step 58 described hereinabove.

Further, the method 72 may comprise creating a symbol track 108 that has the chords, rests and measure bars. The chords may be added to the symbol track one at a time. A new bar symbol may be inserted in the appropriate places, given the key signature and measure length. The symbol track may then be analyzed for gaps. The appropriate rest symbols may further be inserted into the symbol track to fill these gaps.

Moreover, the method 72 may further comprise calculating clefs for each measure 110. If over a pre-determined percentage of notes are located above the middle C in a measure, then a treble clef 112 is used (shown in FIG. 7). Likewise, if over a pre-determined percentage of notes are located below the middle C in a measure, then a bass clef 114 (shown in FIG. 7) is used. Changes in the clefs 112, 114 may also be added to the symbol track.

The method 72 may also include modifying symbol tracks 116 so that all the symbols in all the tracks with the same start times will align in the different staffs. Each track may be given a symbol for every start time that appears in the received music data, or MIDI file, received by the computer system 10. If a track does not have a symbol for a particular start time, then a "ghost" symbol may be added for that time. The width of each symbol may also be assigned the same width across all tracks.

The method 72 may further include analyzing the symbol track 118 for opportunities to make chords into pairs and triplets. If two or more chords are next to each other, are of the same duration and are within the same measure, then the computer system 10 may note this such that the chords may be drawn with a connecting bar instead of with individual tails.

Finally, the method 72 may include making the staff 120 combining the clefs 112, 114, the key signature 54, and the symbol track. This is the data structure that may be utilized to eventually draw the musical score 34 on the screen 12.

Figure 6:
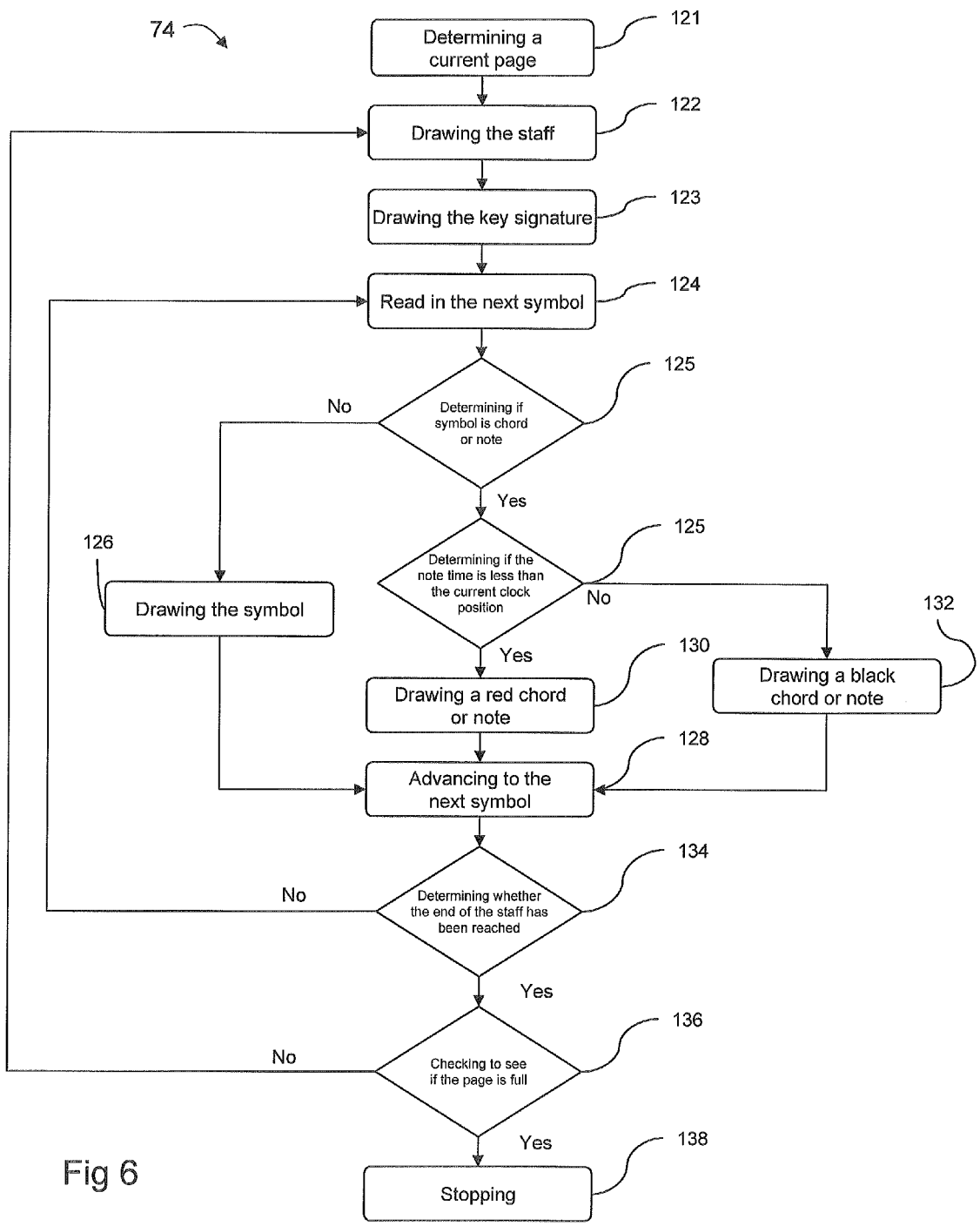
FIG. 6 depicts a block diagram of an embodiment of a drawing method implemented by an embodiment of the computer system of FIGS. 1-5.

Referring now to FIG. 6, the drawing method 74 is shown. The method 74 may first include determining a current page 121. This may be determined using the clock positioner 84, described hereinabove. Next, the method 74 may include drawing the staff 122 and drawing the key signature 123. The method 74 may then include reading the next symbol 124 and then determining if the symbol is a chord or note 125. If the symbol is not a chord or note, the method 74 may include drawing the symbol 126 and the advancing to the next symbol 128.

If the symbol is a chord or note, the method 74 may include determining if the note time is less than the current clock position 127 determined by the clock positioner 84. If the note time is less than the clock position, the method 74 may include drawing the note or chord red 130. Of course, it should be understood that any appropriate color is contemplated. If the note time is not less than the current clock position determined by the clock positioner 84, then the method 74 may include drawing the note or chord black 132. Again, any different note color is contemplated. Furthermore, any other indicating method is contemplated. For example, the note indicator may be a bouncing ball, or an arrow displayed to denote the position of the playing of the song 62. The method 74 then proceeds to the advancing to the next symbol 128 step.

After the advancing to the next symbol 128 step, the method 74 may include determining whether the end of the staff has been reached 134. If the end of the staff 134 has not been reached, the method 74 may include reading the next symbol 124. If the end of the staff has been reached, the method 74 may include checking to see if the page is full 136. If the page is full, then the method 74 may include stopping 138. If the page is not full, then the method 74 may include looping back and drawing another staff 122.

Referring now to FIG. 7, the display 12 of the computer system 10 is shown having an image of the user interface 142. The computer system 10 may thus be configured to display the score 34, the clefs 112, 114, a time signature 143, and a key signature 144. Shown on the score are a plurality of chords 146 and notes 148. The computer system 10 may also be configured to display a musical keyboard 150, as shown at the bottom of FIG. 7. The musical keyboard 150 may be configured to illuminate the current keys that should be depressed by the student during the playing of the song 58.

The user interface 142 may further include a scroll bar 152 that is configured to show the relative location of a song that is currently being played during the playing of the song 62 so that a user may move the song to a desired location. The user interface 142 may include a stop button 154, and a play/pause button 156. The play/pause button 156 may begin the playing of the song 58 on each of the display 12, the sound card 64, and the player module 18. Likewise, the stop button 154 may stop the playing of the song 58 on each of the display 12, the sound card 64, and the player module 18. Depressing the play/pause button 156 while computer system 10 is playing a song 62 may pause the playing of the song 58 on each of the display 12, the sound card 64, and the player module 18. The user interface 142 may also include button 157 where a user may review back to a desired location and button 158 where a user may cue forward to a desired location.

The user interface 142 may include a repeat function 160. The repeat function 160 may allow a user to select several notes to play over and over. The repeat function 160 may include a start button 162, a stop button 164, a previous button 166 and a next button 168. The repeat function 160 may also include a repeat box 170. A user may click the repeat box 170 to enable the repeat functionality. Then a user may press the start button 162 during the playing of the song 58 to determine a location to begin the repetition. The user may then press the stop button 164 to determine a place to end the repetition. The previous button 166 may be pressed to practice the preceding duration in the song. For example, if exactly five seconds are repeated originally, the previous button 166 may play the previous five seconds. Likewise, if exactly five seconds are repeated originally, the next button 168 may play the next five seconds. Like the play button 156, the stop button 154 and the pause button 158, the repeat function 160 may affect each of the display 12, the sound card 64, and the player module 18. The repeat function may further continuously repeat the repeated section of the score 34 during the playing of the score until a command is received to end the repetition. Moreover, if the stop button 164 is depressed when the repeat function 160 is on, the playing of the song 62 may progress beyond the place that was previously the repeat stop point. In this embodiment, when the stop button 164 is released, a new stop point may be set and the playing of the song 62 may repeat the time segment defined by the previous start point and the new stop point.

The user interface 142 may include a play back speed scroll bar 172 so that a user may increase or decrease the playback speed during the playing of the song 58. Again, this scroll bar may affect each of the display 12, the sound card 64, and the player module 18.

The user interface 142 may also include a location toggle 174 for determining a location of the player module 18 on the keyboard. For example, as described hereinabove, the player module 18 may not include a full eighty-eight LEDs 24, 26 to cover each key 20, 30 of the keyboard 22. Thus, a user may toggle if the player module 18 is located up an octave or down an octave, or in the middle. Thus, there is a low toggle 176, a medium toggle 178 and a high toggle 180.

Furthermore, the user interface 142 may also include a left hand box 182 and a right hand box 184. The left hand box 182 may be "checked" to configure the computer system 10 to play the left hand on the sound card 64 and the player module 18, as described hereinabove. Likewise, the right hand box 184 may be "checked" to configure the computer system 10 to play the right hand on the sound card 64 and the player module 18, as described hereinabove. If only one of the hands is checked, only a portion of the total song or composition may be played by the player module 18 and the sound card 64, as described hereinabove.

Moreover, the user interface 142 may include a zoom toggle 186 for zooming in or out of the score 34 so that the notes appear larger or smaller and less or more of the score 34 is shown on the display 12 at a time.

Furthermore, the buttons actuated on the display 12 by the user interface 142 may be "hot-keyed." For example, the "Esc" key may actuate the stop button 154, the F1 key may actuate the play/pause button, 156, the F2 key may actuate the review button 157, the F3 key may actuate the cue button 158, the F4 key may actuate the Repeat on and off button 170, the F5 key may actuate the previous button 166, the F6 key may actuate the start button 162, the F7 key may actuate the stop button 164, the F8 key may actuate the next button 168, the F9 key may actuate the playback speed increase button 172, the F10 key may actuate the playback speed decrease button 172, the F11 key may check the left hand box 182, the F12 key may check the right hand box 184 and the Ctrl key may open a file. Of course, the user interface 142 may be reassigned with other hot keys. Additionally, the program may allow a user to reassign the hot keys to the user's preference.

Referring now to FIGS. 8-10, the player module 18 is shown having the plurality of LEDs 24, 26 and the elongated outer frame 28. The elongated outer frame 28 may be transparent so that the LEDs 24, 26 may be seen while still being housed within. The elongated outer frame 28 may be made of plastic, a composite, a glass, Plexiglas®, or any other appropriate protective material. The elongated outer frame 28 is shown having a rectangular cross section. However, other cross sections are also contemplated. For example, the elongated outer frame 28 may have a triangular cross section. In this embodiment, the LEDs 24, 26 may be mounted at an angle to more directly face a keyboardist playing the keyboard 22, rather than face directly upwards (as in the case of the embodiment of FIGS. 8-10).

The player module 18 may further include a processor 186 configured to receive note-on signals and note-off signals sent by the processor of the computer system 10. Each of the plurality of LEDs 24, 26 may be controlled by a corresponding note-on signal and a corresponding note-off signal, such that each of the plurality of LEDs 24, 26 is configured to illuminate when the processor 186 receives the corresponding note-on signal and note-off signal. The player module 18 may include LEDs having two different colors. A first plurality of LEDs 24 may comprise a first color, for example red, and may each be located above the black keys 20 when the player module 18 is correctly placed on top of the keys 20, 30 of the keyboard 22. Moreover, a second plurality of LEDs 26 may comprise a second color, for example green, and may be located above the white keys 30 when the player module 18 is correctly placed on top of the keys 20, 30.

The processor 186 and each of the plurality of LEDs 24, 26 may be attached to an elongated circuit board 188 extending a length of the elongated outer frame 28. Two channels 190 may be defined within the elongated outer frame such that the elongated circuit board 188 is insertable into and maintainable within the channels 190. The elongated outer frame 28 may have removable end caps (not shown) in order to provide access to the channels 190 and to remove the insertable elongated circuit board 188.

On a back side of the player module 18, shown in FIG. 10, a plurality of backings 192 may be attached to prevent clicking of the keys 20, 30 of the keyboard 22 against the elongated outer frame 28 when the player module 18 is resting on the keyboard and in use. The backings 192 may be made of cloth, rubber, felt, or any other appropriate material that would not click against the keys 20, 30 of the keyboard 22.

Furthermore, the player module 18 may include a USB port 194 for establishing a communication between the player module 18 and the computer system 10 via a USB cable. However, other communication mechanisms are contemplated. For example, a wireless transceiver may establish a connection between the player module 18 and the computer system 10. It should be understood that any communication mechanism known to those skilled in the art of device communication are contemplated.

Figure 11:
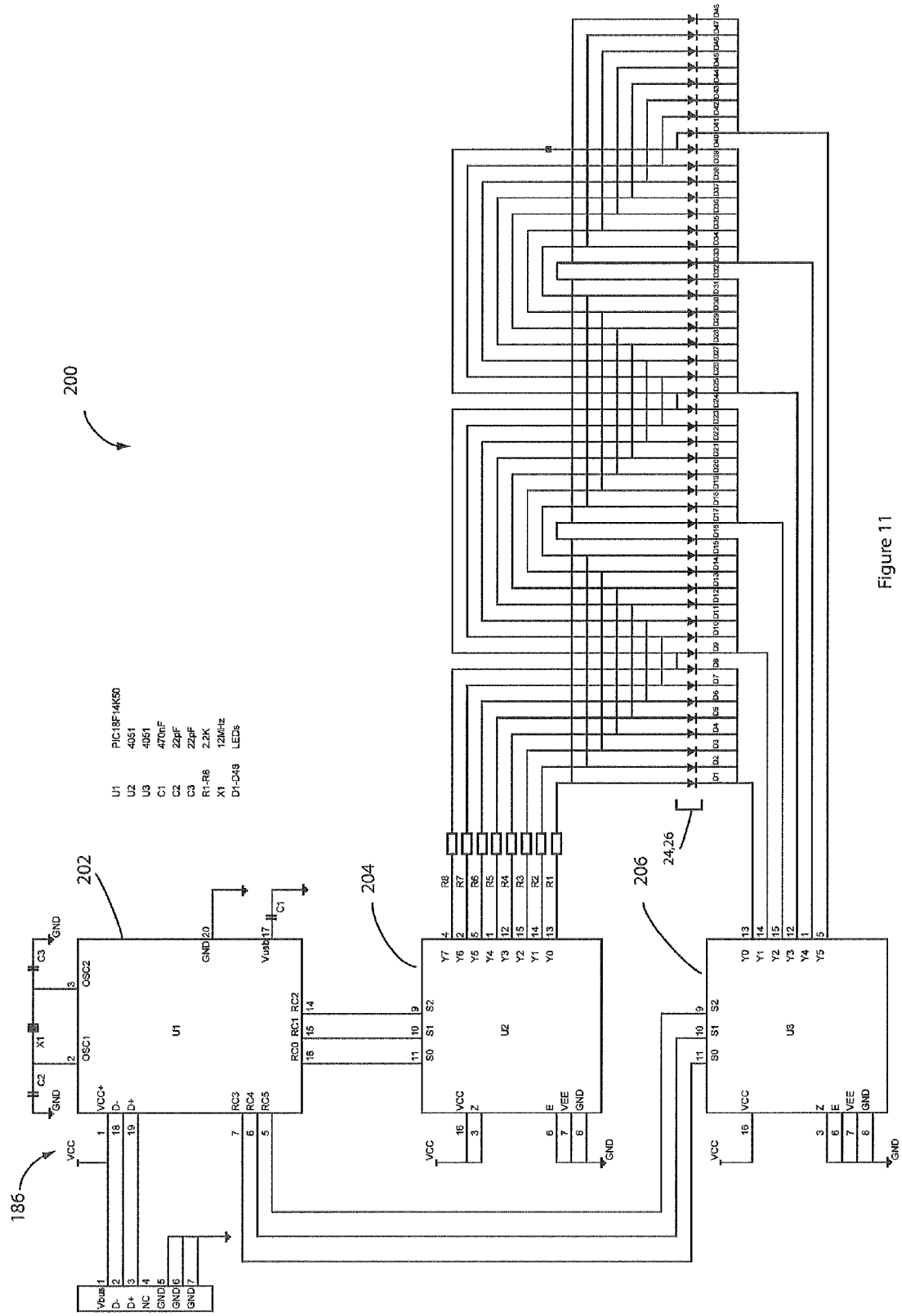
FIG. 11 depicts an embodiment of a circuit diagram of an embodiment of the player module of FIGS. 1 and 8-10.

Referring now to FIG. 11, a circuit diagram 200 is shown connecting the processor 186 and the LEDs 24, 26. The circuitry is shown including the processor 186 comprising three chips 202, 204, 206. The circuit is also shown comprising a "rainbow" pattern rather than the expected linear arrangement. This rainbow circuitry simplifies the circuit board layout and minimizes the number of intersecting tracks. To provide for this configuration, there may be an algorithm within the firmware of the processor 186 that is configured to translate the note-on signals and note-off signals from the computer into a signal that goes to the correct LED.

To reduce the number of circuit paths, each LED 24, 26 may be illuminated by the processor 186 scanning both the anode and the cathode of the LED 24, 26. Thus, in this configuration, only 2n lines are required to illuminate n^2 of the LEDs 24, 26 independently. For example, to illuminate the left most LED D1, the chip 204 powers LEDs D1, D16, D17 D32, D33 and D48. At the same time, the LEDs D1 to D8 are connected to the ground. As a result, only D1 is illuminated. In other embodiments, the polarities can be controlled to illuminate more of the LEDs 24, 26 or support multi-colored LEDs.

The LEDs 24, 26 may be scanned at a rate in excess of 30 Hz so that from the human eye, the LEDs 24, 26 appear to be constantly illuminated. The duty cycle of the pulse may also be changed to control the brightness of the player module 18, as described hereinabove with respect to the methods performed by the computer system 10 of the described embodiments.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A player module comprising:
an elongated outer frame;
a communication mechanism for communicating with a computer system, the computer system including a display;
a processor housed entirely within the elongated outer frame, the processor configured to receive:
a plurality of note-on signals from the computer system, each corresponding to a musical pitch; and
a plurality of note-off signals from the computer system, each corresponding to a musical pitch; and
a plurality of LEDs extending along the elongated outer frame such that each individual LED is located above a corresponding key of a keyboard when the elongated outer frame is placed above the keys of a keyboard;
wherein each of the plurality of LEDs is controlled by a corresponding note-on signal and a corresponding note-off signal such that the plurality of LEDs correspond to notes being played on a score that is being displayed on the display of the computer system, such that each of the plurality of LEDs is configured to illuminate when the processor receives the corresponding note-on signal at the same time that a corresponding note is being indicated on the score, and each of the plurality of LEDs is configured to stop illuminating when the processor receives the corresponding note-off signal at the same time that the corresponding note is no longer being indicated on the score wherein the plurality of LEDs are connected with a rainbow circuitry wherein 2N lines are capable of independently illuminating N^2 LEDs.

2. The player module of claim 1, wherein the plurality of LEDs include:
a first set of LEDs of a first color located above white keys of the keyboard when the elongated outer frame is placed above the keys of the keyboard; and
a second set of LEDs of a second color located above the black keys of the keyboard when the elongated outer frame is placed above the keys of the keyboard.

3. The player module of claim 1, wherein the plurality of LEDs and the processor are attached to an elongated circuit board extending a length of the elongated outer frame, the elongated circuit board insertable into and maintainable within at least one channel located inside the elongated outer frame.

4. The player module of claim 1, wherein the elongated outer frame includes at least one backing configured to prevent clicking of the keys against the elongated outer frame.

5. The player module of claim 1, wherein the processor is configured to scan through a sequence of musical pitches corresponding to the musical pitches of the plurality of note-on and note-off signals.

6. The player module of claim 1, wherein the elongated outer frame spans a length of the keyboard that is less than an entire length of the keyboard.

7. The player module of claim 1, wherein the elongated outer frame is a clear extruded plastic case.

8. The player module of claim 1, further comprising a USB port for accepting the plurality of note-on signals and the plurality of note-off signals, and wherein the plurality of note-on signals and the plurality of note-off signals are transmitted from a computer.

9. The player module of claim 1, wherein each of the plurality of LEDs correspond to one of a plurality of keys of the keyboard, such that the player module is placeable over the keyboard at a plurality of locations, and wherein each location is an octave apart.

10. A player module comprising:
an elongated outer frame;
a communication mechanism for communicating with a computer system, the computer system including a display;
a processor housed entirely within the elongated outer frame, the processor configured to receive:
a plurality of note-on signals from the computer system, each corresponding to a musical pitch; and
a plurality of note-off signals from the computer system, each corresponding to a musical pitch; and
a plurality of LEDs each extending along the elongated outer frame such that each individual LED is located above a corresponding key of a keyboard when the elongated outer frame is placed on top of the keys of the keyboard;
the processor configured to illuminate a particular LED from the plurality of LEDs when the particular LED corresponds to a musical pitch of a note-on signal received by the processor such that the plurality of LEDs correspond to notes being played on a score that is being displayed on the display of the computer system and the particular LED is illuminated at the same time that a corresponding note is being indicated on the score; and
the processor configured to stop illuminating the particular LED when the particular LED corresponds to a musical pitch of a note-off signal received by the processor at the same time that the corresponding note is no longer being indicated on the score wherein the plurality of LEDs are connected with a rainbow circuitry wherein 2N lines are capable of independently illuminating N^2 LEDs.

11. The player module of claim 10, wherein the plurality of LEDs include:
a first set of LEDs of a first color located above white keys of the keyboard when the elongated outer frame is placed above the keys of the keyboard; and
a second set of LEDs of a second color located above the black keys of the keyboard when the elongated outer frame is placed above the keys of the keyboard.

12. The player module of claim 10, wherein the plurality of LEDs and the processor are attached to an elongated circuit board extending a length of the elongated outer frame, the elongated circuit board insertable into and maintainable within at least one channel located inside the elongated outer frame.

13. The player module of claim 10, wherein the elongated outer frame includes at least one backing configured to prevent clicking of the keys against the elongated outer frame.

14. The player module of claim 10, wherein the elongated outer frame spans a length of the keyboard that is less than an entire length of the keyboard.

15. The player module of claim 9, wherein the elongated outer frame is a clear extruded plastic case.

16. The player module of claim 10, further comprising a USB port for accepting the plurality of note-on signals and the plurality of note-off signals, and wherein the plurality of note-on signals and the plurality of note-off signals are transmitted from a computer.

17. The player module of claim 10, wherein the processor is configured to scan through a sequence of musical pitches corresponding to the musical pitches of the plurality of note-on and note-off signals.

18. The player module of claim 10, wherein each of the plurality of LEDs correspond to one of a plurality of keys of the keyboard, such that the player module is placeable over the keyboard at a plurality of locations, and wherein each location is an octave apart.

19. A system comprising:
 a player module that includes:
  an elongated outer frame;
  a processor housed entirely within the elongated outer frame, the processor configured to receive:
   a plurality of note-on signals, each corresponding to a musical pitch; and
   a plurality of note-off signals, each corresponding to a musical pitch; and
  a plurality of LEDs extending along the elongated outer frame such that each individual LED is located above a corresponding key of a keyboard when the elongated outer frame is placed above the keys of a keyboard;
 a computer system that includes a display configured to display a musical score corresponding to the plurality of note-on signals and the plurality of note-off signals;
 wherein each of the plurality of LEDs is controlled by a corresponding note-on signal and a corresponding note-off signal such that the plurality of LEDs correspond to notes being played on the musical score that is being displayed on the display of the computer system, such that each of the plurality of LEDs is configured to illuminate when the processor receives a corresponding note-on signal at the same time that the corresponding note is being indicated on the musical score, and each of the plurality of LEDs is configured to stop illuminating when the processor receives the corresponding note-off signal at the same time that the corresponding note is no longer being indicated on the musical score wherein the plurality of LEDs are connected with a rainbow circuitry wherein 2N lines are capable of independently illuminating N^2 LEDs.

* * * * *